United States Patent
Channell et al.

[11] Patent Number: 5,584,411
[45] Date of Patent: Dec. 17, 1996

[54] TANK ASSEMBLY AND METHOD FOR WATER TREATMENT

[75] Inventors: Alan B. Channell, Columbia City; Terry S. Shears, Fort Wayne, both of Ind.

[73] Assignee: Chemical Engineering Corporation, Churubusco, Ind.

[21] Appl. No.: 561,298

[22] Filed: Nov. 21, 1995

[51] Int. Cl.[6] .................................................. B65D 90/04
[52] U.S. Cl. ......................... 220/465; 220/590; 220/403
[58] Field of Search ..................................... 220/465, 403, 220/589, 590, 588, 586, DIG. 1

[56] References Cited

U.S. PATENT DOCUMENTS

| | | | |
|---|---|---|---|
| 814,375 | 6/1905 | Hardie | 220/DIG. 1 |
| 1,574,690 | 2/1926 | Radabaugh | 220/465 |
| 2,372,800 | 4/1945 | Stearns | 220/3 |
| 2,376,831 | 5/1945 | Stearns | 220/3 |
| 2,721,674 | 10/1955 | Lazard | 220/465 |
| 3,119,543 | 1/1964 | Walker | 229/14 |
| 3,169,690 | 2/1965 | Scholle | 229/14 |
| 3,419,173 | 12/1968 | Verlinden | 220/5 |
| 3,874,544 | 4/1975 | Harmon | 220/3 |
| 3,891,118 | 6/1975 | Laurizio | 220/288 |
| 4,164,304 | 8/1979 | Roberson | 220/465 |
| 4,177,934 | 12/1979 | Hammes | 220/355 |
| 4,219,125 | 8/1980 | Wiltshire | 220/5 |
| 4,518,558 | 5/1985 | Anway et al. | 264/515 |
| 4,579,242 | 4/1986 | Ellis, III | 220/5 |
| 4,589,563 | 5/1986 | Born | 220/3 |
| 4,778,073 | 10/1988 | Ehs | 220/590 |
| 4,793,491 | 12/1988 | Wolf et al. | 206/509 |
| 4,905,856 | 3/1990 | Krogager | 220/3 |
| 4,925,044 | 5/1990 | Hembert | 220/3 |
| 4,993,579 | 2/1991 | Burchett | 220/403 |
| 5,004,120 | 4/1991 | Hembert | 220/414 |
| 5,137,162 | 8/1992 | Fritz | 215/31 |
| 5,158,131 | 10/1992 | Hurner | 220/465 |
| 5,169,019 | 12/1992 | Büdenbender | 220/465 |
| 5,169,024 | 12/1992 | Rinkewich | 220/586 |
| 5,217,138 | 6/1993 | Nichols | 220/465 |
| 5,253,778 | 10/1993 | Sirosh | 220/590 |
| 5,287,987 | 2/1994 | Gaiser | 220/589 |
| 5,287,988 | 2/1994 | Murray | 220/589 |
| 5,376,200 | 12/1994 | Hall | 156/173 |
| 5,429,845 | 7/1995 | Newhouse et al. | 220/465 |

FOREIGN PATENT DOCUMENTS

| 92016432 | 10/1992 | WIPO | 220/465 |
|---|---|---|---|

*Primary Examiner*—Stephen J. Castellano
*Attorney, Agent, or Firm*—Baker & Daniels

[57] ABSTRACT

The present invention involves a pressurized water treatment system and method having a unitary liner and flange and a plurality of interchangeable heads. The system utilizes non-threaded connections where periodic detachment is desirable to eliminate the cross-threading problems posed by plastic threads. The coupling devices include an improved clamp assembly to removably secure the water treatment heads to the liner flange or other system components and an improved spring clip to removably attach inlet and outlet lines to water treatment heads and fittings. By including L-shaped tabs, the spring clip reduces the chance of inadvertent dislodgement. The use of common connectors allows any of the interchangeable heads to be used with the liner and other fittings. Adapters can also be used to allow non-system components to be integrated into the system. A fill port adaptor can also be disposed between the liner and water treatment head to provide access to the tank interior without the removal of the head.

9 Claims, 11 Drawing Sheets

FIG_1

FIG_18

FIG_17

FIG_2

FIG_3

FIG_4

FIG_5

FIG_6

FIG_7

FIG_8

FIG_9

FIG_10

FIG_11

FIG_16

FIG_23    FIG_24

FIG_25

5,584,411

TANK ASSEMBLY AND METHOD FOR WATER TREATMENT

BACKGROUND OF THE INVENTION

1. Field of the Invention

The present invention relates to residential and commercial water treatment systems, and, more particularly, to pressurized tank liners, fittings and coupling devices for residential and commercial water treatment systems.

2. Description of the Related Art

Residential and commercial water treatment tanks are generally used to hold either a sacrificial or filtration media through which water is directed for treatment. For example, the removal of iron, hydrogen sulfite, copper, zinc, lead and other compounds often requires adjustment of the water's pH. A common method of adjusting pH is by the use of calcium carbonate as a sacrificial media. This requires the periodic replenishment of the sacrificial medium placed within the water treatment tank. It is desirable to have a hole in the dome or top of the tank to ease this replenishment. Filter media, such as activated carbon, filter sand, anthracite coal and various grades of gravel, are used to remove unwanted taste, odor, color and turbidity. Periodic access is also necessary for such filter media to either replace or clean the media.

Early water treatment pressure vessels were welded steel tanks which were both heavy and susceptible to corrosion even when painted and epoxy lined. With the development of fiberglass reinforced plastic tanks (i.e., FRP tanks) corrosion problems were eliminated. FRP tanks, however, were susceptible to impact damage which often occurred during transport. Although FRP tanks are capable of withstanding high internal pressures, impact damaged areas inevitably leak and cannot be repaired. Filament wound tanks eventually replaced FRP tanks. Early filament wound tanks, although having a rugged exterior, had a brittle ABS (i.e., acrylonitrile butadiene styrene) plastic liner which was susceptible to cracking. Currently, the majority of filament wound tanks utilize an extremely durable polyethylene liner.

Polyethylene, however, is not well suited for use with threaded fittings. Fittings attached to water treatment tanks must often be detached to allow for access to the tank interior for replenishment of the medium, to perform maintenance on the tank or fitting, or to exchange the fitting. The use of threaded unions to attach the tank liner, inlet, and outlet lines to these fittings is undesirable because the fittings and liner are often constructed of plastic and the cross-threading of plastic fittings is a significant problem. Such cross-threading occurs frequently when fittings are re-installed after removal and the resultant damage is not easily repaired. Plastic threads can also bind, making it extremely difficult to remove a previously installed fitting.

A two piece liner having a polyethylene vessel and a threaded insert with more durable threads has been developed. Conventional polyethylene tanks often have a two piece liner and a filament wound outer shell as disclosed in U.S. Pat. No. 3,874,544 and U.S. Pat. No. 4,579,242, the disclosures of which are explicitly incorporated by reference. The tank liner generally consists of an internally threaded insert and a vessel which is blow molded around the insert as disclosed in U.S. Pat. No. 4,589,563, the disclosure of which is explicitly incorporated by reference. An injection molded internally threaded tank end can also be bonded to an ABS tank liner after the liner has been blow molded.

All such two piece liners have a seam, glue joint or heat welded bond where the two pieces interface and such joints can contain voids and structural weaknesses. When pressurized, the joint between the insert and vessel is subjected to stresses and may form small cracks or the bond may fail which can create leakage problems.

Another method which has been developed to avoid the problems presented by plastic threads is to utilize a flanged tank insert for use with clamps and O-rings. Although this type of construction avoids the use of plastic threads it still includes the use of a tank insert. For example, a tank insert may have a flange, on top of which an O-ring is seated, followed by a basket filter flange, a second O-ring and then a valve flange. The flanges and O-rings are then all secured together by a four piece collar shaped clamp. One problem with this method is that the O-rings are disposed axially and the pressure of the contained fluid generates a force perpendicular to the bearing forces the sealed parts are exerting against the O-ring. As the pressure of the contained fluid is increased the sealed parts tend to pull apart axially. This axial force lessens the bearing force on the O-ring and thereby its effectiveness. The pressure forces also stress the joint between the tank vessel and insert which, as previously mentioned, can lead to potential leakage and structural problems.

Another problem with conventional tanks is the lack of a convenient port to access the tank interior. One option has been to provide an additional dome hole near the top of the tank. However, in conventional filament wound tanks, such dome holes can weaken the structural integrity of the tank, be expensive to produce and pose a potential leakage problem.

Female plastic threads present problems not only for the liner and fitting connection but also for connections involving the inlet and outlet lines. In response to this problem, a spring clip has been developed for coupling inlet and outlet lines to plastic fittings without the use of female threads. The inwardly directed tabs of a partially circular resilient spring clip are inserted into slots in the fitting to secure the inlet and outlet lines. The tabs extend through the slots and into an annular groove in an insert which has been affixed to the inlet or outlet line. The line is thereby removably secured to the fitting without a threaded connection between the fitting and the line. One problem with such a connection, however, is that when the line is not under pressure the clip may loosen and can be dislodged from the fitting.

SUMMARY OF THE INVENTION

The present invention provides a tank system for treating water with a one piece liner having an integral flange, a universal flanged connection for use with a plurality of interchangeable heads, and non-threaded connections utilizing a spring clip and circumferential O-rings.

The invention comprises, in one form thereof, a unitary blow molded polyethylene (or other appropriate material) liner with an integral tank flange. The integral flange provides a method for attaching fittings without the use of a liner insert. By eliminating the liner insert, there is no danger of separation, formation of cracks or failure of the bond at the joint between the liner vessel and liner insert. Moreover, the manufacture of a liner with integral flange is simpler and less expensive than that of a two piece liner. Due to the integral flange an insert is no longer required and the step of attaching the liner and insert is eliminated. The blow molding process is also simplified because the liner no longer has to be blow molded around the insert or be molded to mate with an insert.

The system includes a plurality of heads, each adapted for different water treatment purposes and having a flange below which is a neck. The tank flange and cooperating neck flange of the heads each have a flat surface and an opposite, inclined camming surface. When the head is attached to a tank, the flat surfaces of the two flanges are in mutual engagement. The inclined camming surfaces are engaged by a clamp and urge the tank and head into closer engagement as the clamp is tightened.

The clamp used to secure the head to the liner is comprised of three pieces. The increased simplicity of the clamp assembly eases both manufacture and the removal and installation of the heads.

The liner has a cylindrical extension immediately adjacent to the tank liner. The neck of the head is also cylindrical and is adapted for insertion into the cylindrical extension of the liner. A circumferential O-ring is disposed in a groove on the neck and mutually engages the neck and cylindrical extension of the liner when the head is attached to the liner.

A fill port adaptor can be disposed between the head and liner to provide access to the liner. Inlet and outlet lines are attached to the head with a spring clip and insert assembly which utilizes generally L-shaped tabs to prevent the inadvertent dislodging of the spring clips.

An advantage of the present invention is that the unitary liner does not have a joint between the vessel and a liner insert which can fail as is a possibility with the prior art. Thus, the integral liner provides added strength to the tank while at the same time eliminating the necessity of attaching the vessel to such an insert.

Another advantage is that the universal clamped flange connection and the spring clip assembly, which are common to a system of different water treatment heads, ease the attachment and removal of the interchangeable heads. The improved non-threaded connections and interchangeable head configurations allow a single liner to be used with many different heads and eases the removal of heads for replacement or repair.

Yet another advantage is that the circumferential O-ring is disposed so that as the contained fluid is pressurized the additional pressure increases the bearing forces acting upon the O-ring. Thus, the increased pressure enhances the effectiveness of the O-ring.

Still another advantage is that the fill port adaptor is configured to cooperate with the liner and interchangeable heads of the system. The fill port adaptor's access port allows the tank media to be replenished or removed without the removal of the head and without the use of a dome hole.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates embodiments of the invention, in several forms, and such exemplifications are not to be construed as limiting the scope of the invention in any manner.

DESCRIPTION OF THE PRESENT INVENTION

The embodiments disclosed below are not intended to be exhaustive or limit the invention to the precise forms disclosed in the following detailed description. Rather, the embodiments are chosen and described so that others skilled in the art may utilize their teachings.

Figure 1:
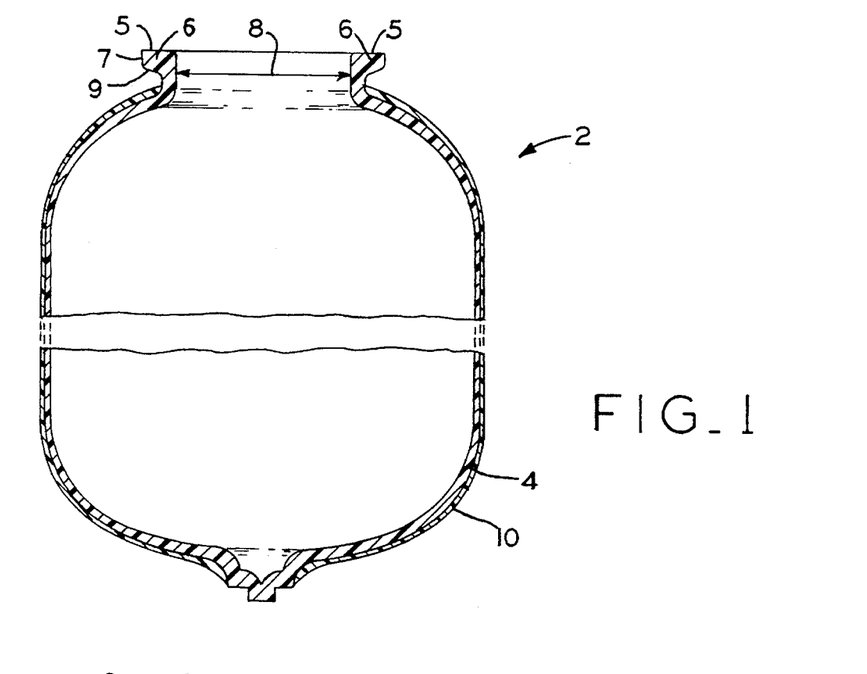
FIG. 1 is a view of a tank according to the present invention shown in partial cross-section.

The present invention relates to tank 2 which is shown in FIG. 1. The tank 2 has a molded liner 4 of unitary construction with an integrally formed flange 6 which surrounds an opening 8. Liner 4 and tank flange 6 are constructed of blow molded polyethylene, however, other materials can also be used. To provide additional strength, a filament wound outer shell 10 is applied to the liner 4. The outer shell 10 is constructed of fiberglass and epoxy, however, other materials can also be used.

Figure 18:
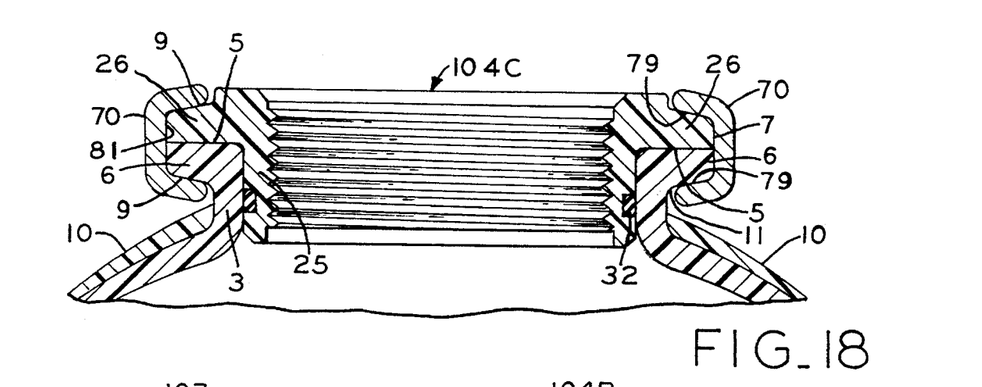
FIG. 18 is a cross-sectional view of an installed threaded adaptor.

Below flange 6 is a generally cylindrical extension 3 which is illustrated in FIG. 18. Fittings which are adapted for securement to liner 4 have a generally cylindrical neck 25 which extends below a neck flange 26. The fitting neck 25 is inserted through opening 8 and is co-operant with extension 3. An annular recess 30 is located on neck 25 within which a circumferential O-ring 32 is disposed. Circumferential O-ring 32 engages both neck 25 and extension 3 when neck 25 is inserted into extension 3.

Flange 6 has a generally flat circular surface 5 which surrounds and is generally co-planar with opening 8 and is disposed at an approximately 90 degree angle to the axis of cylindrical extension 3. Neck flange 26 also has a generally flat circular surface 5 which extends from neck 25 and is disposed at an approximately 90 degree angle to the axis of neck 25. A lip surface 7 is located at the edge of flange 6 and neck flange 26 and is disposed at an approximately 90 degree angle to flat surface 5. An inclined camming surface 9 is located on flange 6 and neck flange 26 opposite flat surface 5. Camming surface 9 is inclined such that the thickness of flange 6 and neck flange 26 is smallest at lip surface 7 and greatest at the intersection of flange 6 with extension 3 and neck flange 26 with neck 25. Rounded corners 11 define a transition between flat surface 5 and the interior surface of extension 3, flat surface 5 and the exterior surface of neck 25, lip surface 7 and camming surface 9, and camming surface 9 and the exterior surface of extension 3.

The use of flange 6 and neck flange 26 on many different tanks and fittings provides a universal connection which enables any fitting or liner having a flange 6 to be connected with a fitting have a neck flange 26. (A "universal" connection or component is used herein to refer to a connection or component which can be utilized with a large number of interchangeable cooperating components which are interchangeable because they share common cooperating elements.)

A clamp assembly 70 is used to secure opening flange 6 together with neck flange 26 and consists of three pieces, a first 72 and second 74 clamp piece and a latch 76. Partially circular first 72 and second 74 clamp pieces have extensions 78 for engaging flanges 6 and 26. Inclined camming surfaces 79 located on the interior of extension 78 engage camming surfaces 9 of flange 6 and neck flange 26. As the first and second clamp pieces are tightened about flange 6 and neck flange 26 the inclined disposition of camming surfaces 9 and 79 urge the flange 6 and neck flange 26 into closer proximity to each other. Interior surface 81 of clamp pieces 72 and 74 abuts lip surface 7 of flange 6 and neck flange 26 when the clamp assembly 70 is tightly secured as shown in FIG. 18.

Figure 12:
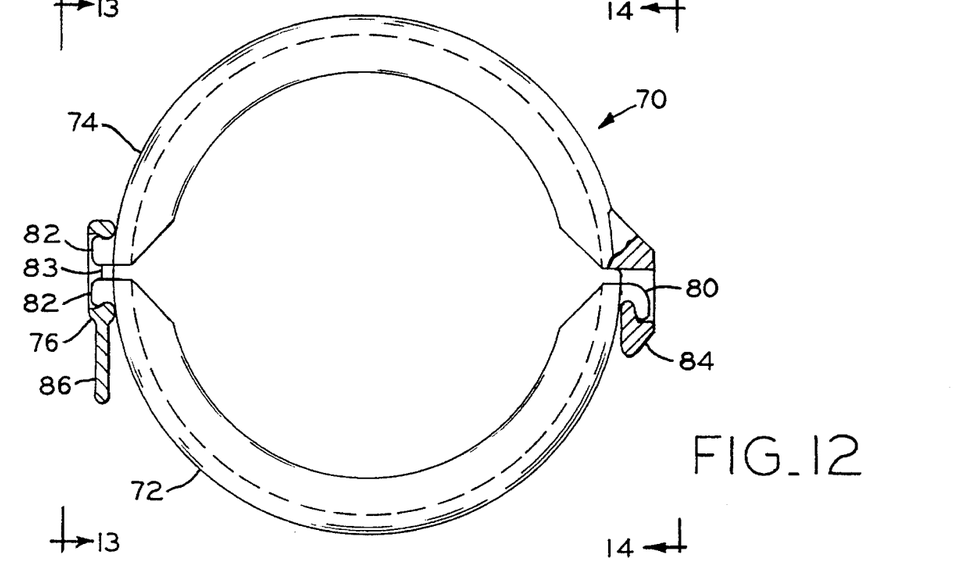
FIG. 12 is a plan view of a clamp forming a part of the present invention.
Figure 13:
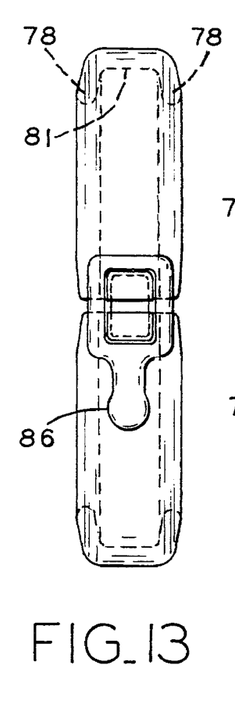
FIG. 13 is a view of the clamp taken along line 13—13 of FIG. 12.

To secure the clamp assembly 70, first clamp piece 72 has a male part 80 at its first end and a second male part 82 at its second end. Second clamp piece 74 has a female part 84 at its first end which is co-operant with male part 80 and a second male part 82 at its second end. Latch 76 has a lever 86 and inward facing lip 88. In FIG. 12, male part 80 is shown engaging female part 84 and lip 88 is shown engaging second male part 82 from both first 72 and second 74 clamp pieces. Lever 86 facilitates removal and installation of latch 76. Thus, flange 6, neck flange 26 and clamp assembly 70 comprise a non-threaded connection which avoids the problems of plastic threading. The clamp assembly is constructed of a composite material and can maintain a pressurized connection.

An advantage of the universal neck assembly of the present invention is the circumferentially disposed O-ring 32. When a head having a circumferentially disposed O-ring 32 is connected to a tank 2 and pressurized, the circumferential O-ring 32 will be subjected to greater bearing pressures between the head and liner 4 thereby increasing the sealing capacity of O-ring 32. In comparison, if an O-ring were disposed axially between the flat surfaces of a tank flange and fitting flange the flat flange surfaces would generate smaller not larger bearing forces against such an axial O-ring when the tank was pressurized. The smaller bearing pressures decrease rather than increase the sealing capacity of an axial O-ring.

Another important feature of the universal neck assembly of the present invention is the commonly configured neck 25 and neck flange 26 which is adapted for cooperation with any opening 8 and flange 6. As shown in FIGS. 2–9 and 11, each of the heads and fill port adaptor 66 have a neck 25 extending from neck flange 26 with an annular recess 30 within which circumferential O-ring 32, not shown in every Figure, is disposed. This common configuration of components enables every head and fitting to be easily inserted and removed from any liner 4 or a fitting such as the fill port adaptor 66 having an opening 8 and flange 6.

Figures 14, 15:
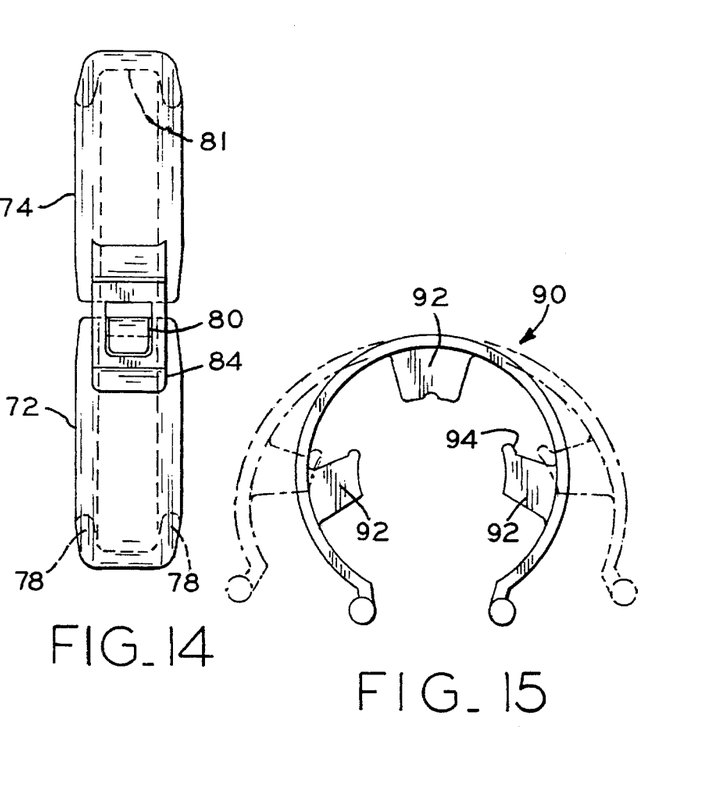
FIG. 14 is a view of the clamp taken along line 14—14 of FIG. 12.
FIG. 15 is a view of a spring clip according to one aspect of the present invention.

Another feature of the present invention which increases the interchangeability of system components are the inlet 16 and discharge 24 ports having slots 28 which are present on each head. A spring clip 90, shown in FIG. 15, has a set of three inward extending tabs 92 which are co-operant with slots 28. Two of the three tabs 92 are generally L-shaped and have a foot 94 which extends circumferentially. An insert 96, shown in cross-section in FIGS. 10 and 19, has a neck with an annular recess 30 within which a circumferential O-ring 32 is disposed and an annular groove 98 which is co-operant with slots 28 and tabs 92. Insert 96 is secured by inserting its neck within the fitting port up to stop 100 such that annular groove 98 is in line with slots 28. Tabs 92 are then inserted into slots 28 by flexing spring clip 90 and properly positioning tabs 92. When spring clip 90 is inserted and returns to its unflexed position, feet 94 extend beyond the limits of slots 28 thereby retaining tabs 92 within annular groove 98. To remove insert 96, spring clip 90 must be flexed to allow the removal of tabs 92 and feet 94. The dashed outline of spring clip 90 shown in FIG. 15 illustrates spring clip 90 in a flexed condition. Thus, spring clip 90, slots 28, and annular groove 98 comprise a non-threaded connection for removably attaching a water line to a fitting.

Insert 96 also engages an inlet or outlet line, not shown, with threads 102 and thereby allows the inlet or outlet line to be easily detached and re-attached to a head or other fitting. On fill port 68 slots 28 and spring clip 90 cooperate in the same manner with cap 69 to removably secure cap 69 to fill port 68.

Figure 16:
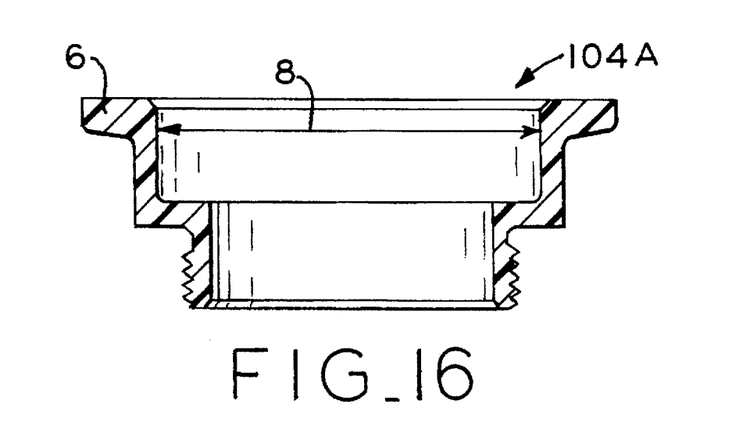
FIG. 16 is a cross-sectional view of a threaded adaptor taken along a diametric line of symmetry.
Figure 17:
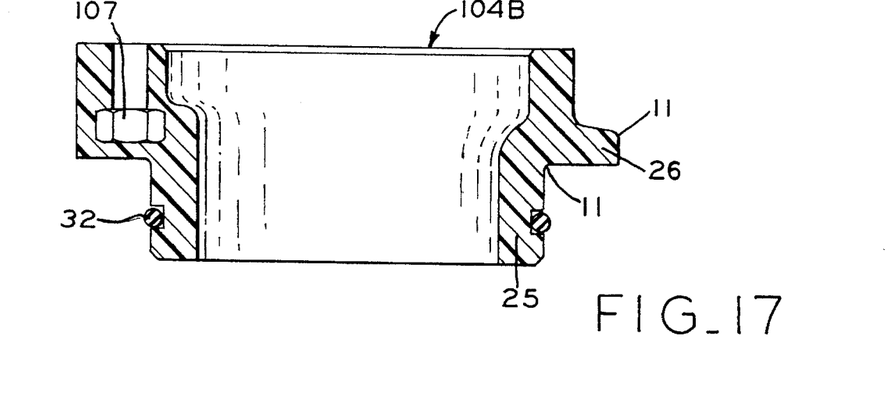
FIG. 17 is a cross-sectional view of another adaptor taken along a diametric line of symmetry.
Figure 19:
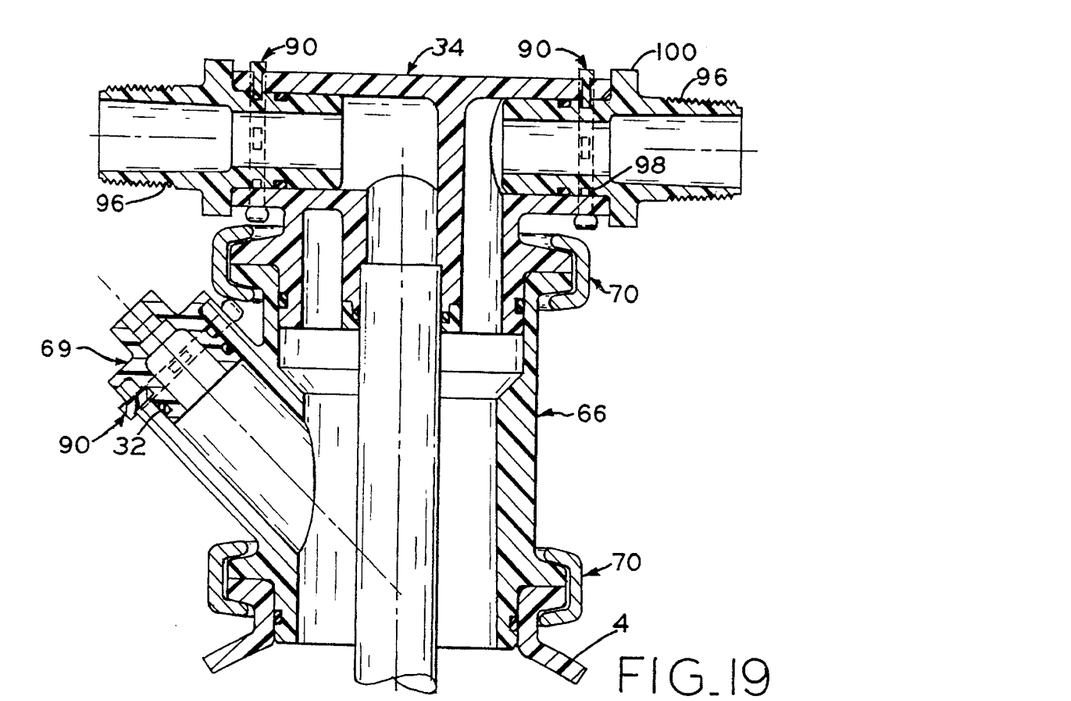
FIG. 19 is a cross-sectional view of a head assembly including the fill port adaptor of FIG. 11.
Figure 20:
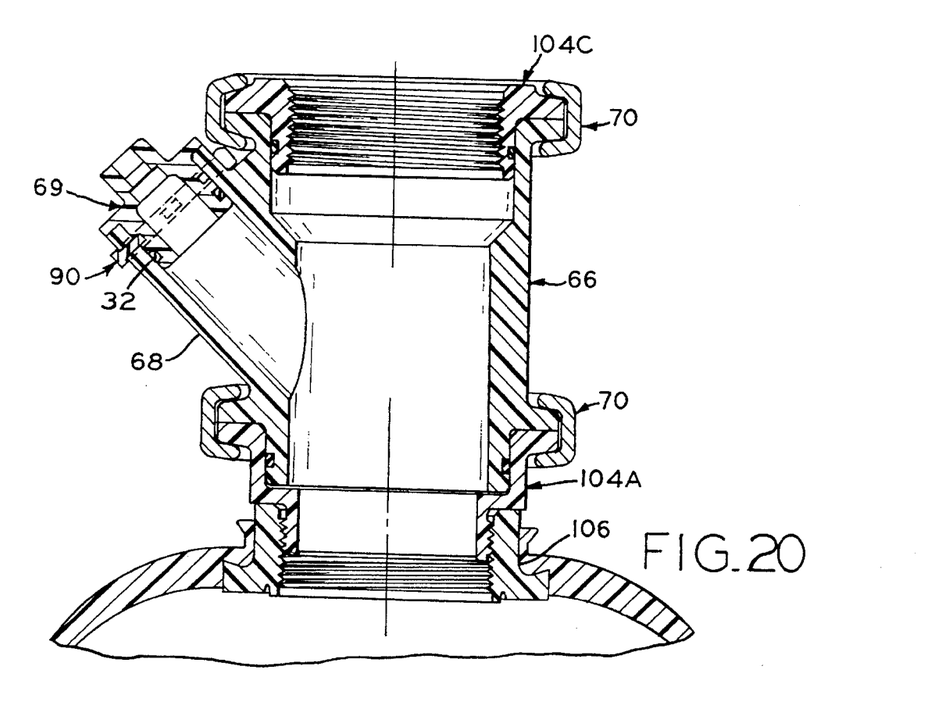
FIG. 20 is a cross-sectional view of another head assembly including the fill port adaptor of FIG. 11.
Figure 21:
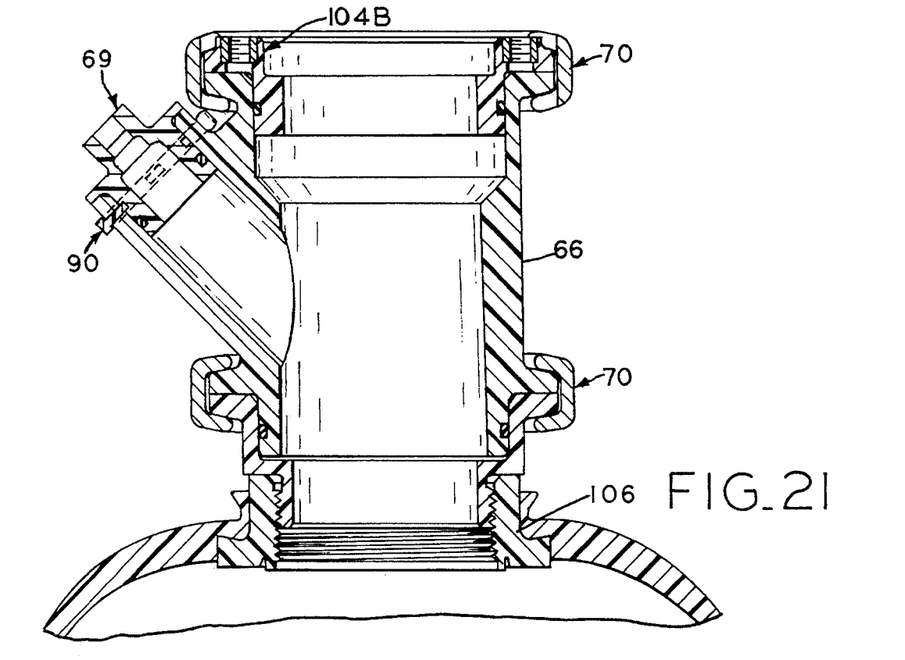
FIG. 21 is a cross-sectional view of yet another head assembly including the fill port adaptor of FIG. 11.
Figure 22:
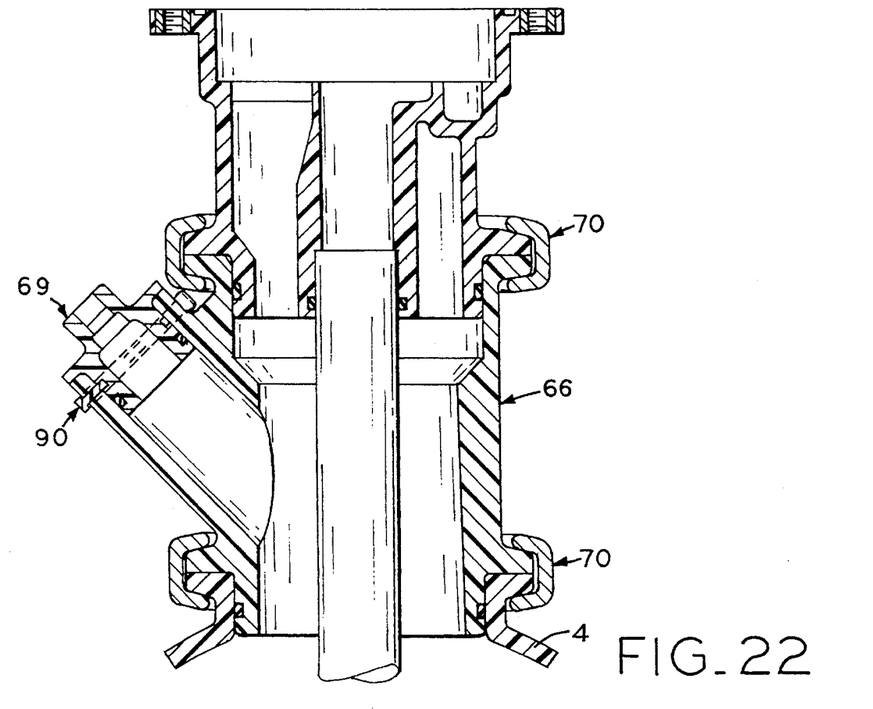
FIG. 22 is a cross-sectional view of still another head assembly including the fill port adaptor of FIG. 11.

Spring clip 90 and insert 96 along with clamp assembly 70 provide two non-threaded connections by which a large number of fittings and heads may be interchanged and alternatively configured in a water treatment system as shown in FIGS. 19–21. Threaded adapters 104A, 104B, and 104C, shown in FIGS. 16, 17 and 18, may also be used to integrate components which are not otherwise compatible with flanges 6 or 26. Threaded adaptor 104A can be threaded into a threaded tank insert 106 as shown in FIG. 20. Threaded adaptor 104B, shown in FIG. 17, can secured to opening flange 6 and secure a fitting (i.e., a plumbing or water treatment accessory such as a valve or head) with threaded bolt holes 107. Threaded adaptor 104C, shown in FIG. 18, can turn opening 8 into a threaded opening and thereby engage threaded fittings. The threads of adaptor 104B can be integrally formed with the adaptor 104B or be a more durable metal insert such as threaded insert 107.

Figure 2:
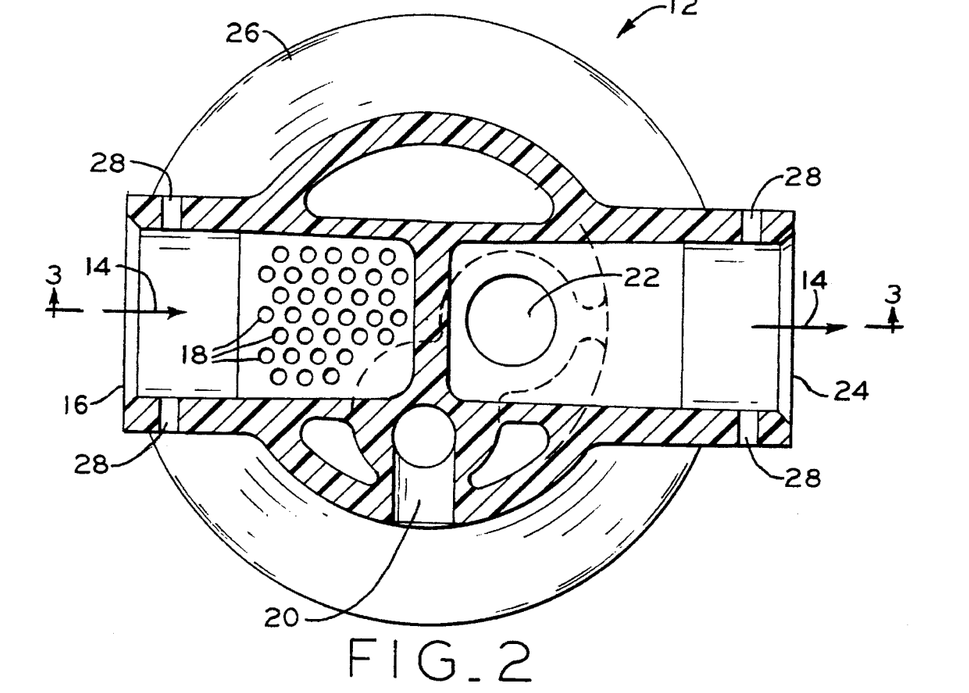
FIG. 2 is a sectional view of an air release valve head taken along line 2—2 of FIG. 3.
Figure 3:
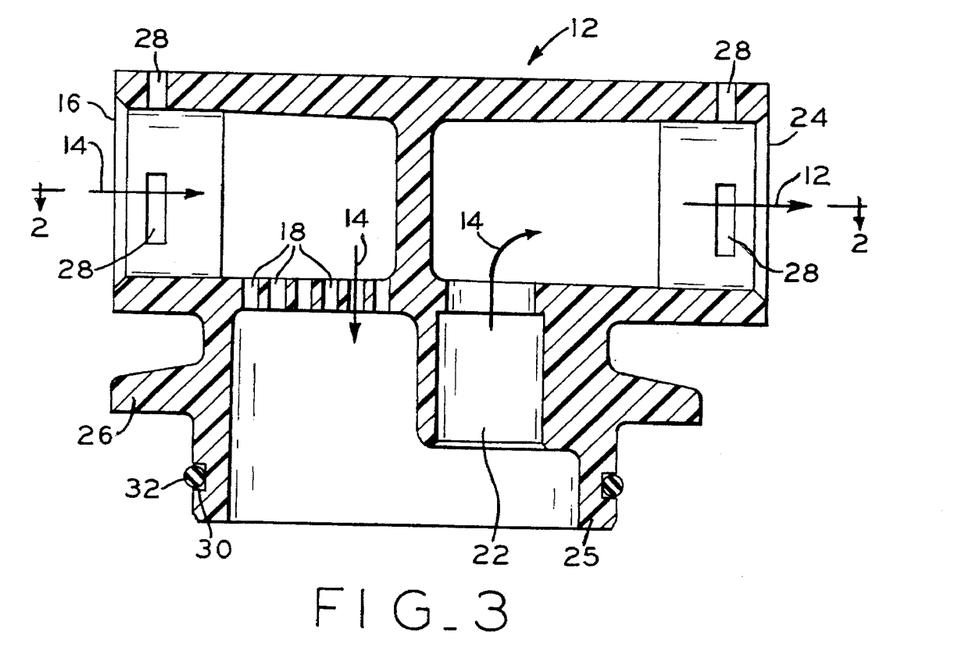
FIG. 3 is a cross-sectional view taken along line 3—3 of FIG. 2.

By utilizing universal flange 6 or neck and neck flange 26 a large number of different heads and fittings can be connected to liner 4 and combined together for connection with liner 4. FIGS. 2–10 illustrate a number of different types of heads which can be so attached to liner 4 to perform various functions. An air release head 12 is shown in FIGS. 2 and 3 and can be used to vent excess air from a plumbing system. Flow direction 14 of the water is indicated on the figures. Prior to entry into air release head 12 the water can be aerated for treatment purposes, for example, by the use of a venturi tube to aspirate the water with outside air. The water then enters the air release head 12 at inlet port 16 and is subdivided into numerous smaller flows by aeration channels 18. The liner 4 provides a residence time sufficient for air to separate from the water. The excess air is then released through air release port 20 which has a float actuated valve, which is not shown in the figures. The treated water is forced up through discharge channel 22 and out discharge port 24 by hydraulic pressure.

Air release head 12 is removably secured to liner 4 by clamping neck flange 26 to opening flange 6. Inlet 16 and outlet 24 ports have slots 28 to accommodate the attachment of inlet and outlet lines to air release head 12.

Figure 4:
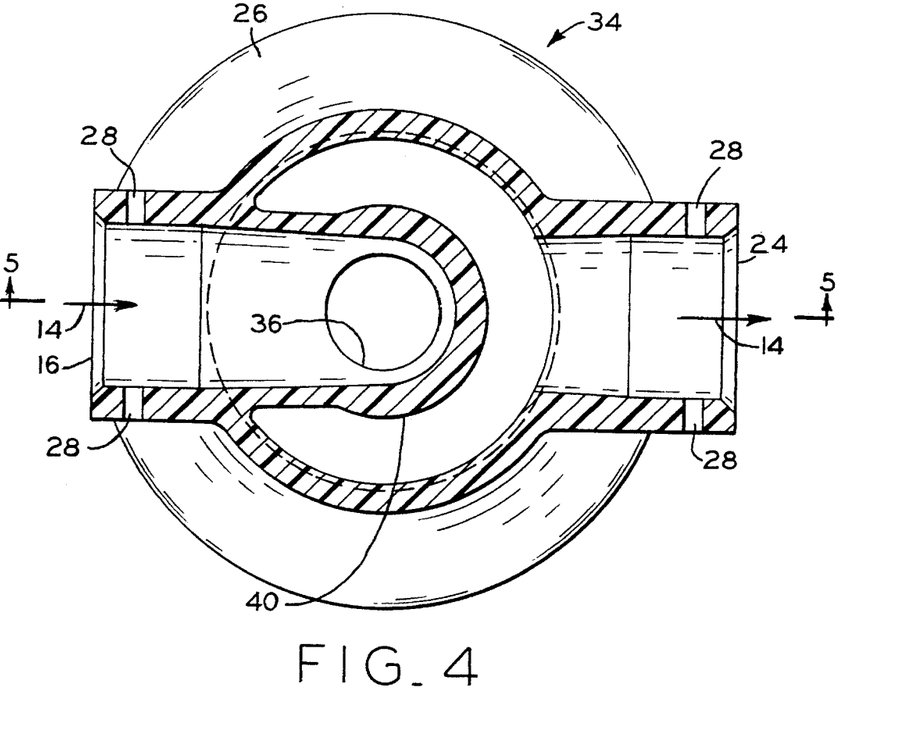
FIG. 4 is a sectional plan view of an upflow neutralizer head taken along line 4—4 of FIG. 5.
Figure 5:
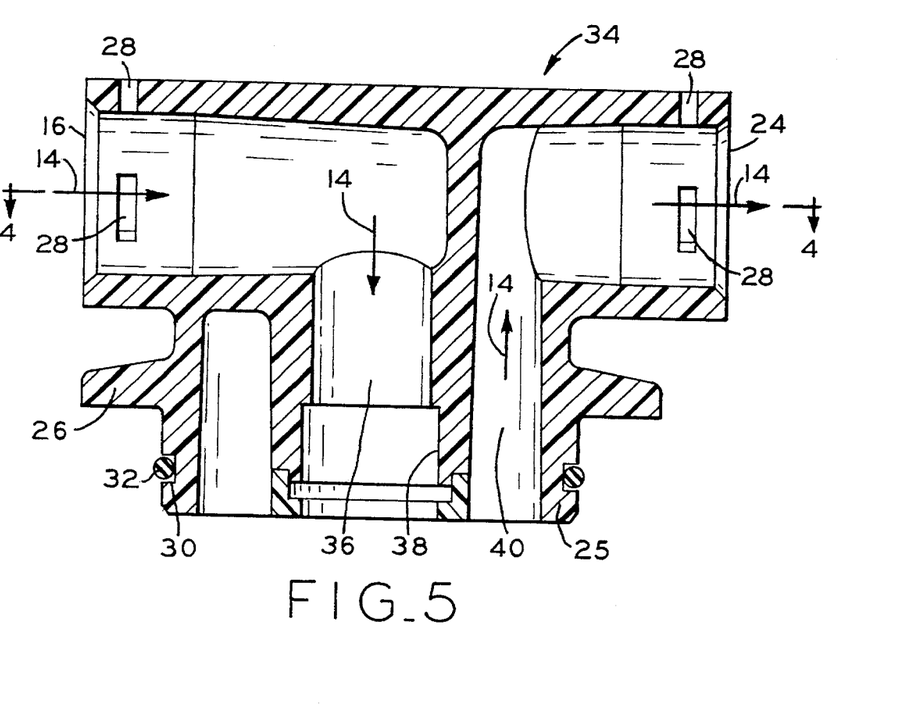
FIG. 5 is a cross-sectional view taken along line 5—5 of FIG. 4.

An upflow neutralizer head 34 is shown in FIGS. 4 and 5 and can be used to elevate the pH of acidic water. The untreated water enters the upflow neutralizer head at inlet port 16 and flow direction 14 is then directed downward through a center downflow channel 36. A socket 38 is provided in upflow neutralizer head 34 within which a distributor tube 39 can be inserted, as shown in FIG. 19. The water then exits distributor tube 39 near the bottom of the liner 4. After exiting distributor tube 39, the water flows up through a media bed, for example, calcium carbonate, a sacrificial media which must be periodically replenished. The water is neutralized by its interaction with the calcium carbonate and is then forced upwards at the perimeter of liner 6 through perimeter upflow channel 40 and out discharge port 24 by hydraulic pressure. By switching the inlet and outline lines the water can be directed to flow down through the sacrificial medium. Additionally, the media selected can be a filter media instead of a sacrificial media.

Figure 6:
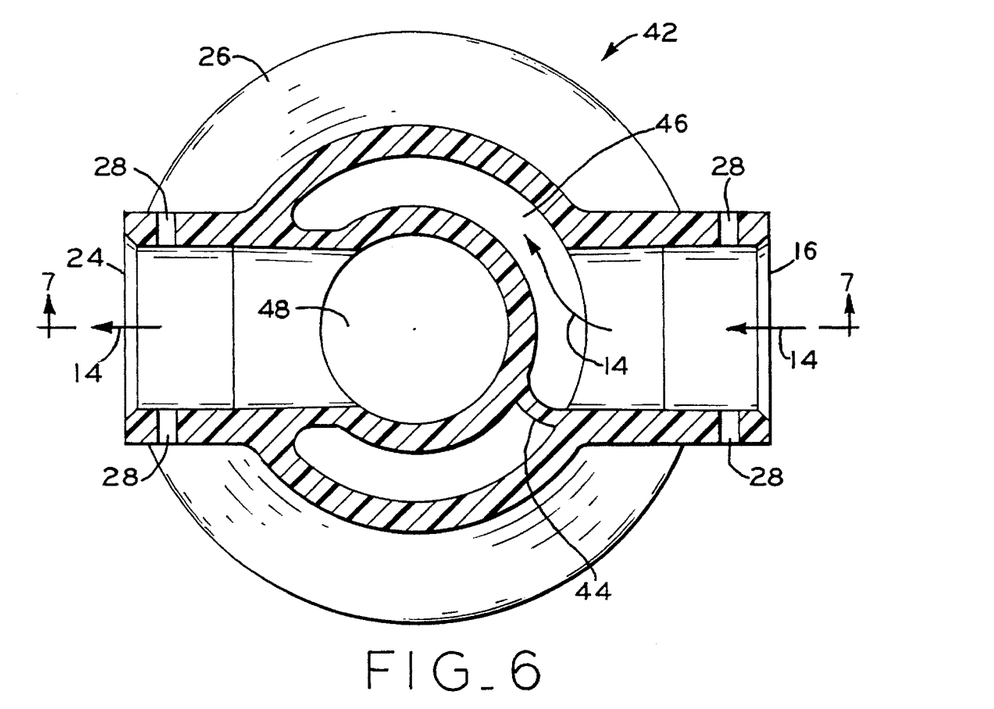
FIG. 6 is a sectional plan view of an in-line filter head taken along line 6—6 of FIG. 7.
Figure 7:
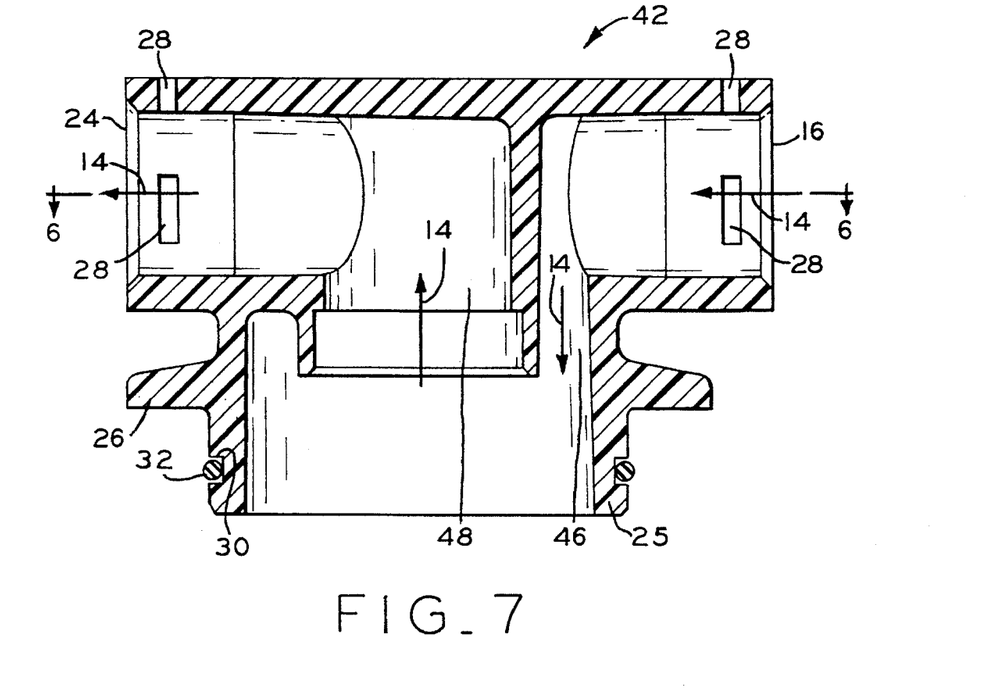
FIG. 7 is a cross-sectional view taken along line 7—7 of FIG. 6.

An in-line filter head 42 is shown in FIGS. 6 and 7 and can be used to remove turbidity, taste, odor or color from the water, depending upon the filter media which is selected. Common media are activated carbon, filter sand, anthracite coal and various grades of aggregate or gravel. Untreated water enters the head at inlet port 16 and is directed into a circumferential and downward flow pattern by flow guide 44 and perimeter downflow channel 46. Suspended and dissolved particles are then removed from the water by the filter media which must be periodically removed or cleaned. The treated water is then forced by hydraulic pressure up through the socket 38 and center upflow channel 48 before being discharged through discharge port 24.

Figure 8:
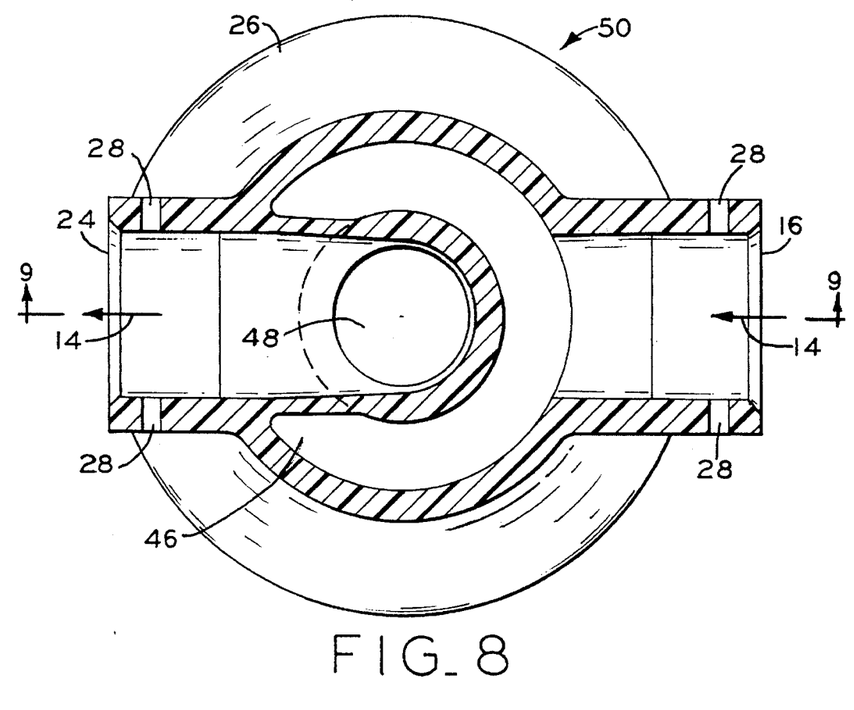
FIG. 8 is a sectional plan view of a UV (i.e., ultraviolet light) head taken along line 8—8 of FIG. 9.
Figure 9:
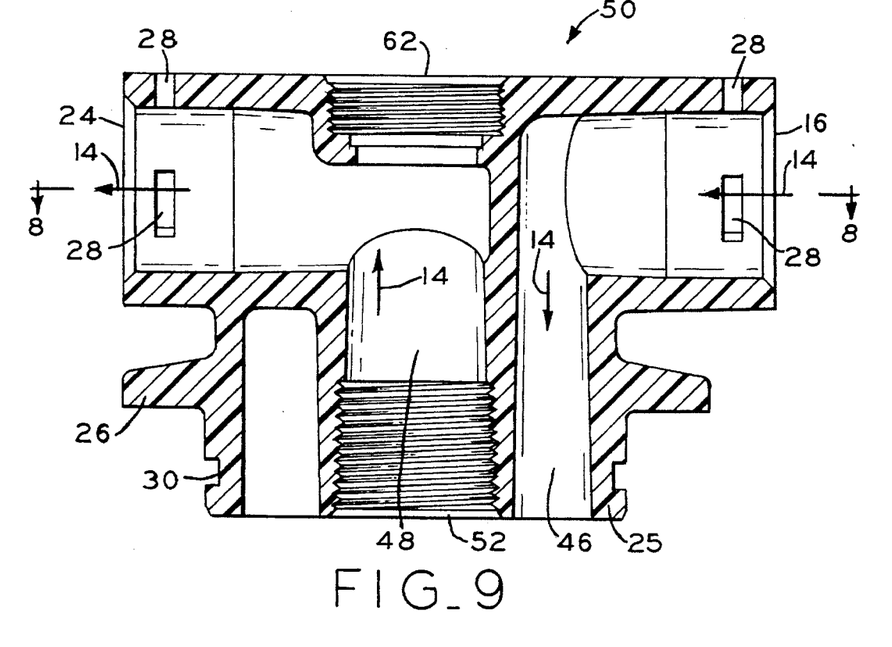
FIG. 9 is a cross-sectional view taken along line 9—9 of FIG. 8.
Figure 10:
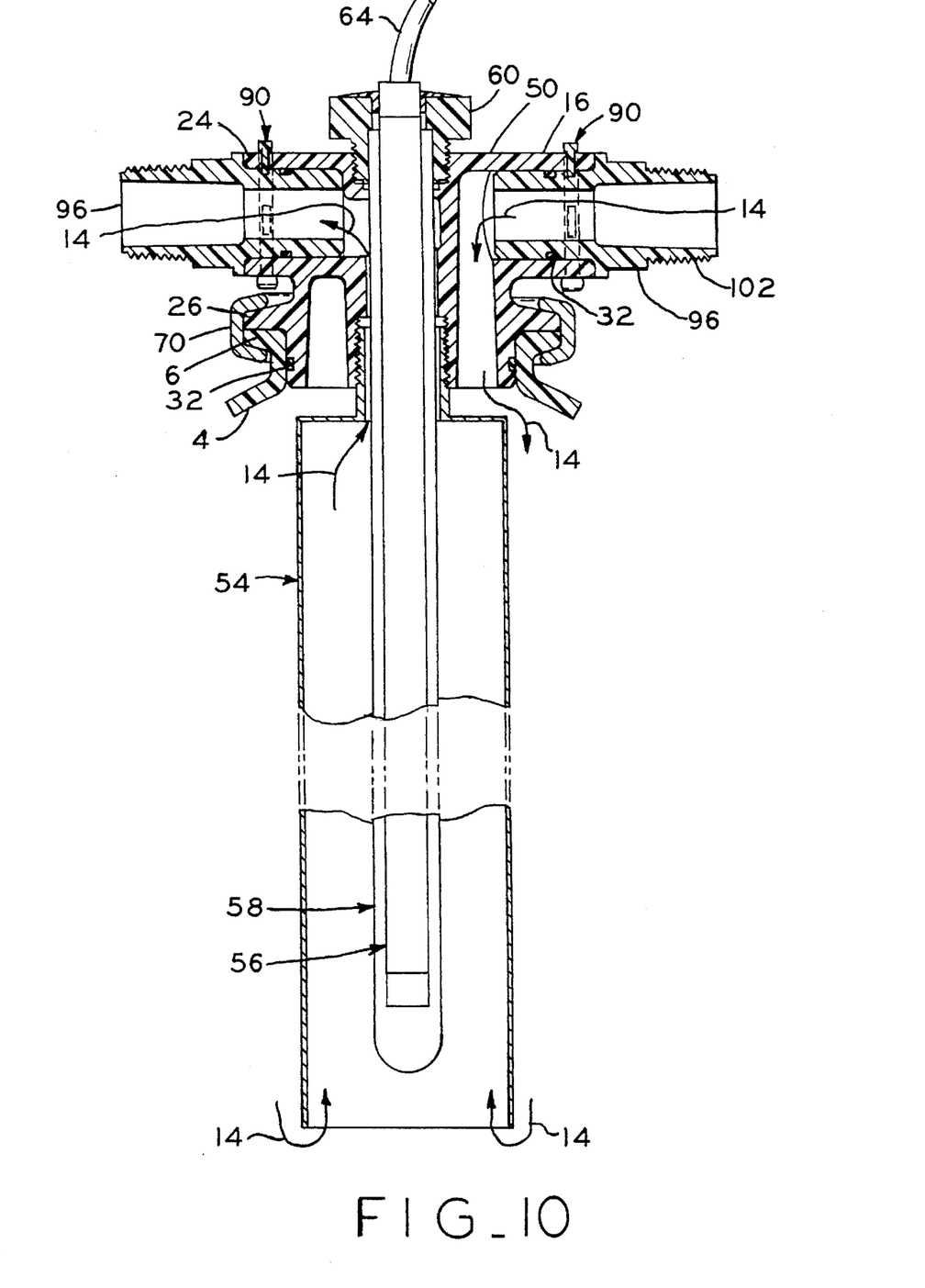
FIG. 10 is a cross-sectional view of an installed UV head of the type shown in FIGS. 8 and 9.
Figure 11:
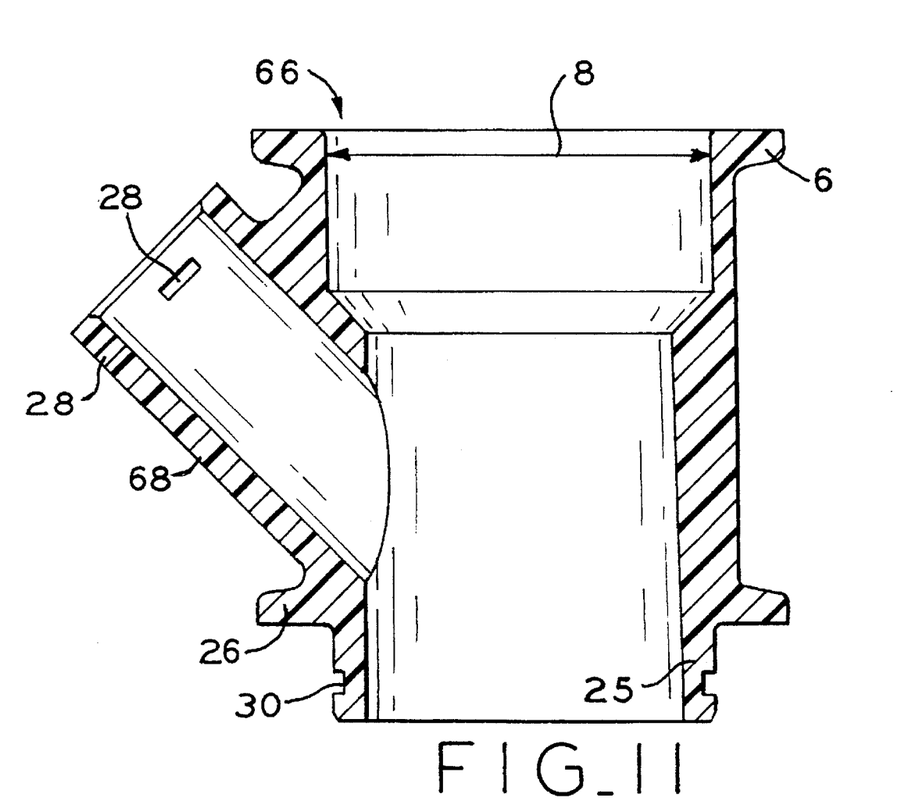
FIG. 11 is a cross-sectional view of a fill port adaptor taken along a diametric line of symmetry.

A UV head 50 is shown in FIGS. 8, 9 and 10. Untreated water enters the inlet port 16 and is directed downward by perimeter downflow channel 44. Threaded socket 52 is used to attach a tube 54 constructed of UV resistant material, such as stainless steel, within which an ultraviolet bulb or UV lamp 56 contained within a glass shroud 58 is inserted. UV lamp 56 and glass shroud 58 are secured by utility plug 60. Utility plug 60 has threads and can be attached to UV head 50 by engagement with threaded utility port 62 and power is supplied to UV lamp 56 by power cord 64. The flow direction 14 of untreated water which enters the liner 4 is downward along the outside perimeter of UV resistant tube 54 and at the open end of UV resistant tube 54 the flow direction 14 is reversed and water flows upward within the UV resistant tube and adjacent to the glass shroud 58 and UV lamp 56. The water is sanitized by the light produced by UV lamp 56 which sterilizes harmful bacteria contained in the water flowing up UV resistant tube 54. The treated water is then discharged through center upflow channel 48 and discharge port 24. To allow an operator or homeowner to determine whether or not UV lamp 56 is burning, utility block 60 is constructed of clear material.

A fill port adaptor 66 is illustrated in FIGS. 11 and 19–22. Fill port adaptor 66 has flange 6 and opening 8 as well as neck 25 and neck flange 26. This enables fill port adaptor to be secured between a head and liner 4. Neck 25 is inserted into liner 4 at opening 8 and fill port adaptor 66 is then secured by clamping neck flange 26 to opening flange 6. Opening flange 6 defines opening 8 into which neck 25 of any head may be inserted. The head is then secured by clamping neck flange 26 to opening flange 6. A fill port adaptor 66 secured to both liner 4 and upflow neutralizer head 34 is illustrated in FIG. 19. In FIG. 19, fill port 68 provides access to liner 4 without requiring the removal of upflow neutralizer head 34. Fill port 68 also has slots 28 which accommodate the attachment of a cap 69 with annular O-ring 32 to seal fill port 68.

Figure 23:
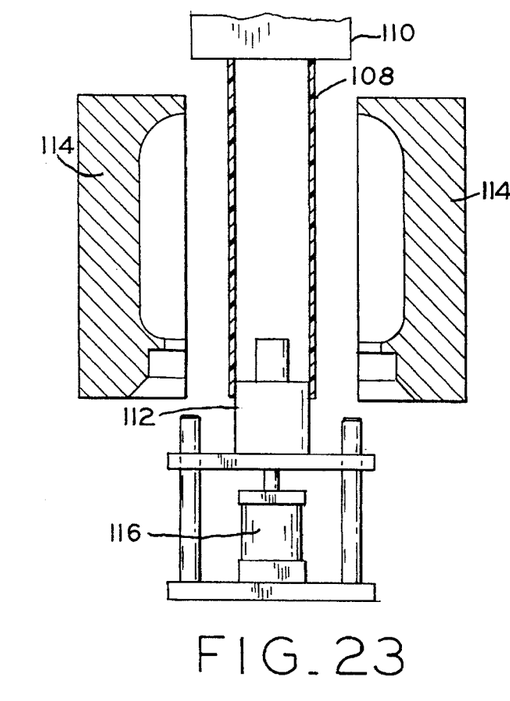
FIG. 23 is a diagrammatic view of a blow molding machine with a parison dropped over the blow pin and the blow pin stand and blow mold halves retracted.
Figure 24:
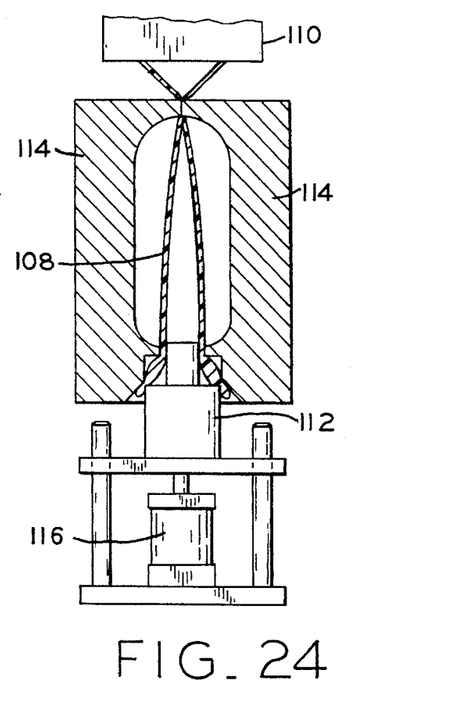
FIG. 24 is a diagrammatic view of the blow molding machine with the blow mold halves closed around a parison and the blow pin stand retracted.
Figure 25:
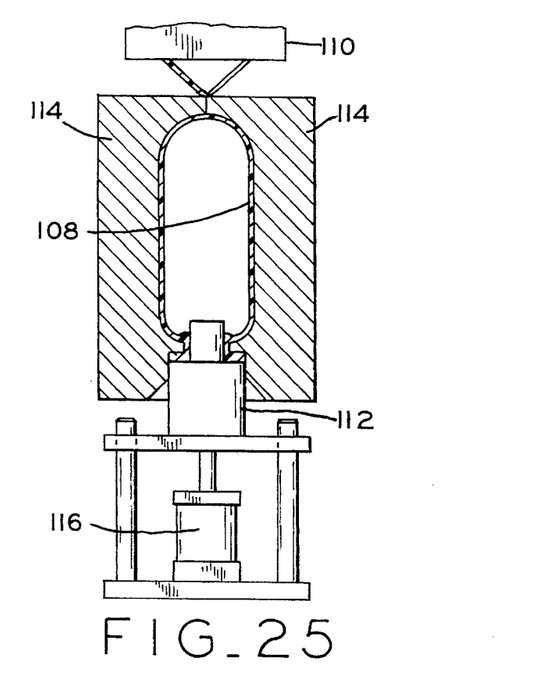
FIG. 25 is a diagrammatic view of the blow molding machine with the blow molding halves closed around a parison, the blow pin stand raised and air being injected.

The manufacture of liner 4 is illustrated in FIGS. 23–25. In FIG. 23 a parison 108 is shown extending from blow molding machine head 110 and dropped over a blow pin stand 112 with the blow pin stand 112 retracted and mold halves 114 opened. The next step is illustrated in FIG. 24 which shows the mold halves 114 after they have been closed on the parison 108. The third step is illustrated in FIG. 25 which shows the parison 108 after the cylinder 116 has raised the blow pin stand 112 and blow air has been injected into the parison 108 from the blow pin. The mold halves 114 are shaped to give parison 108 a generally cylindrical shape and create an integral flange 6 about opening 8. After removal from the mold halves 114, parison 108, now liner 4, is machined to give flange 6 its final shape.

Rotational molding provides another possible means of constructing liner 4. Rotational molding requires the placement of plastic powder in a mold which is then closed and simultaneously rotated about three mutually perpendicular axes. The rotating mold is inserted into an oven which heats the mold and melts the plastic powder. The interior of the mold is lined with a constant thickness of the fluid plastic due to the centrifugal and gravitational forces acting upon the rotating mold. The rotating mold is then placed in a cooling chamber where water is used to cool the rotating mold and solidify the plastic. After the plastic has solidified in the shape of a liner 4, it can be removed from the mold.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A tank assembly for use in water treatment comprising:

a tank having a molded liner of unitary construction with an integrally formed tank flange defining an opening and a surface generally co-planar with said opening, and an outer filament wound shell on said liner;

a head having a generally cylindrical neck with an end and a neck flange extending from said neck at a position axially distant from said neck end; said neck being adapted for insertion into said tank opening and said neck flange and said integral tank flange being adapted for mutual attachment;

said head being adapted to receive and introduce untreated water into said tank and discharge treated water from said tank through an opening in said neck end;

a generally cylindrical clamp assembly having extensions for engaging said tank flange and said neck flange whereby said head is removably secured to said liner; and a seal disposed between said head and said liner.

2. The tank assembly of claim 1 wherein said seal comprises an O-ring circumferentially disposed between said neck and said liner.

3. The tank assembly of claim 1 wherein said liner is one of a blow molded liner and a rotationally molded liner.

4. The tank assembly of claim 1 wherein said clamp further comprises:

a first clamp piece having a male part at a first and second end and said extensions for engaging said neck flange and said tank flange;

a second clamp piece having at a first end a female part adapted to receive said male part at said first end of said first clamp piece, a male part at a second end of said second clamp piece, and said extensions for engaging said neck flange and said tank flange; and a latch for securing said male part at said second end of said first clamp piece to said male part at said second end of said second clamp piece;

whereby said neck flange is secured to said tank flange when said clamp pieces are fastened about said neck and tank flanges.

5. The tank assembly of claim 1 further comprising:

at least two inserts defining a terminal end of an inlet and outlet lines, said inserts having an annular groove and adapted for insertion into at least two ports having a fixed length and located on said head; and a partially circular and resilient clip having a plurality of tabs extending inwardly, at least two of said tabs being generally L-shaped and having a foot extending circumferentially from said tab, said port having an outer surface with a plurality of slots for receiving said tabs, said tabs adapted for extending through said slots and being partially disposed within said annular groove, said tab feet adapted for insertion and removal through said slots when said clip is in a flexed condition, said tab feet extending beyond said slots and preventing removal of said clips when said tabs and tab feet are inserted and said clip is in an unflexed condition.

6. The tank assembly of claim 5 wherein at least one of said inserts has an O-ring seal circumferentially disposed between said insert and said port.

7. The tank assembly of claim 1 wherein said head comprises:

a fill port adaptor having said neck and neck flange extending therefrom, said fill port adaptor disposed between said tank and a second head;

said fill port adaptor having a second flange defining an opening and a surface generally co-planar with said opening and a port providing communication with said tank liner whereby access to said liner is available without removal of said fill port adaptor;

said second head having a generally cylindrical neck with an end and a neck flange extending from said neck at a position axially distant from said neck end; said neck being adapted for insertion into said fill port adaptor opening and said neck flange of said second head and said second flange of said fill port adaptor being adapted for mutual attachment;

a second generally cylindrical clamp assembly having extensions for engaging said second flange of said fill port adaptor and said neck flange of said second head whereby said head is removably secured to said fill port adaptor; and a seal disposed between said second head and said fill port adaptor.

8. The tank assembly of claim 1 wherein said head comprises:

a fitting; and a threaded adaptor having said neck and neck flange extending therefrom and threadedly secured to said fitting.

9. The tank assembly of claim 1 wherein:

said tank flange has a first inclined camming surface opposite said co-planar surface, said first inclined surface most distant from said co-planar surface at said opening;

said neck flange has a second inclined camming surface opposite said neck end, said second inclined surface most distant from said neck end at a point of intersection between said neck flange and said cylindrical neck; and said clamp extensions are adapted for engaging said first and second inclined camming surfaces, whereby said extensions urge said neck and said tank flanges into closer proximity as said extensions increasingly engage said first and second inclined camming surfaces.

* * * * *